United States Patent
Stone

[19]

[11] Patent Number: 5,515,460
[45] Date of Patent: May 7, 1996

[54] TUNABLE SILICON BASED OPTICAL ROUTER

[75] Inventor: Julian Stone, Monmouth, N.J.

[73] Assignee: AT&T Corp., Murray Hill, N.J.

[21] Appl. No.: 362,066

[22] Filed: Dec. 22, 1994

[51] Int. Cl.[6] .................................................. G02B 6/26
[52] U.S. Cl. ............................ 385/24; 385/14; 385/37; 385/40; 385/46
[58] Field of Search ................................ 385/24, 27, 28, 385/31, 32, 36, 37, 10, 2, 3, 8, 9, 46, 40, 14

[56] References Cited

U.S. PATENT DOCUMENTS

| | | | |
|---|---|---|---|
| 3,918,794 | 11/1975 | Milton | 385/40 |
| 4,695,122 | 9/1987 | Ishida et al. | 385/40 |
| 4,737,003 | 4/1988 | Matsumura et al. | 385/40 |
| 4,761,625 | 8/1988 | Sharma | 333/209 |
| 4,786,130 | 11/1988 | Georgiou et al. | 385/40 |
| 5,022,730 | 6/1991 | Cimini et al. | 385/27 |
| 5,101,414 | 3/1992 | Schilling et al. | 372/50 |
| 5,243,672 | 9/1993 | Dragone | 385/46 |
| 5,351,317 | 9/1994 | Weber | 385/3 |
| 5,414,548 | 5/1995 | Tachikawa et al. | 385/14 |

OTHER PUBLICATIONS

Zelikson et al., Appl. Phys. Lett. 61 (14), "Enhanced Electro–Optic Effect In Amorphous Hydrogenated Silicon Based Waveguides" Oct. 5, 1992 pp. 1664–1666.

Bowers et al, "Fiber–Optic Variable Delay Lines", Electronics Letters, Nov. 1982, vol. 18, No. 23, pp. 999–1000.

Zirngibl et al., IEEE Photonics Technology Letters, vol. 4, No. 11, "Demonstration Of A 15×15 Arrayed Waveguide Multiplexer On InP" Nov. 1992.

*Primary Examiner*—Rodney B. Bovernick
*Assistant Examiner*—Hemung Sanghavi

[57] ABSTRACT

An apparatus is provided that allows the tunability of a waveguide bench router with a silicon-based material. This is accomplished by adding a triangular shaped layer of hydrogenated amorphous silicon (a-Si:H) as an active region across the waveguide. By varying a current across the triangle, the refractive index of the layer will change causing a change to the delay of the signal going across the material. Thus eliminated are the need for Group III–V elements or Lithium Niobate as the tunable element, increasing the coupling efficiency and decreasing cost.

12 Claims, 3 Drawing Sheets

TUNABLE SILICON BASED OPTICAL ROUTER

BACKGROUND OF THE INVENTION

1. Field of the Invention

This invention relates generally to optical tuners and more particularly to silicon-based tunable waveguides for an optical bench router.

2. Description of the Related Art

In order for a semiconductor layer to be optically tunable, it must have properties that allow either the index of refraction to change when injected with current, or its optical length to change. Normally Group III–V elements are used as the substrate for an optically tunable device since these elements change their refractive index upon current injection. Lithium Niobate ($LiNbO_3$) is also used as a tunable substrate because of its optical refractive properties.

In most semiconductor devices, silicon-based elements are the preferred material to use because of its ease of fabrication, relative inexpensiveness, and ease of coupling to fiber optic networks. Pure silicon, as a substrate for an optical waveguide, makes a poor choice as it is not tunable. Its optical length does not change upon current injection nor is its refractive index easily variable. Silicon is virtually inert to current injection and therefore not viable as a tunable substrate. The only way to change silicon's refractive index is by heat. This is not a reliable method, nor is it highly controllable.

Hydrogenated amorphous silicon (a-Si:H) is a silicon based semiconductor material that, as reported in "Enhanced Electro Optic Effect in Amorphous Hydrogenated Silicon Based Waveguides" by M. Zelikson et al., *Applied Physics Letters*, Vol. 61, No. 14, Oct. 5, 1992, pages 1664–1666, has been shown to have tunable properties. The waveguide becomes tunable when current is injected across the material. The amount of tuning will vary depending upon the length of the waveguide as well as the amount of current. The length of the waveguide will cause the delay of the light to vary.

A Dragone Router is one use of a waveguide that normally is not tunable. This is a multiplexer that is created by using multiple waveguides. By interconnecting two star couplers with a star waveguide grating, it has been demonstrated that a monolithic 15×15 multiplexer on silicon can be built. This device can become tunable if instead, the multiplexer is built on Indium Phosphate (InP). See "Demonstration of a 15×15 Arrayed Waveguide Multiplexer on InP" by M. Zirngibl et al. IEEE Photonics Tech. Letters, Vol. 4, No. 11, November 1992, pages 1251–53 and U.S. Pat. No. 5,243,672 to C. Dragone. It would be desirable to be able to build a tunable multiplexer using a silicon-based substrate as its bench or active region. This would allow tunability without the high cost of coupling the optics to a Group III–V material or InP. The high cost manifests itself because of the limitations to the waveguide dimensions at the coupling point of the prior art materials. This leads to a certain amount of mismatching between the waveguide and the optics.

SUMMARY OF THE INVENTION

In accordance with the principles of the invention, a triangular shaped hydrogenated amorphous silicon (a-Si:H) layer is added on a silicon substrate to an optical device for tunability. The expense and coupling difficulties of using Group III–V elements or Lithium Niobate are greatly reduced or eliminated. When used as a waveguide or filter, the device will allow a phase shift as the light propagates through the waveguides. The phase shift will vary depending upon the length of the active portion of the waveguide or filter. The triangular shape will allow the active length of the waveguide or filter to vary depending on where the coupling to the signal is placed. This gives the device tunability along the waveguide using only silicon-based components.

BRIEF DESCRIPTION OF THE DRAWINGS

So that one skilled in the art to which the subject invention appertains will better understand how to practice the present invention, preferred embodiments of the apparatus and method will be described in detail hereinbelow with reference to the drawings wherein.

DETAILED DESCRIPTION OF PREFERRED EMBODIMENTS

Figure 1:
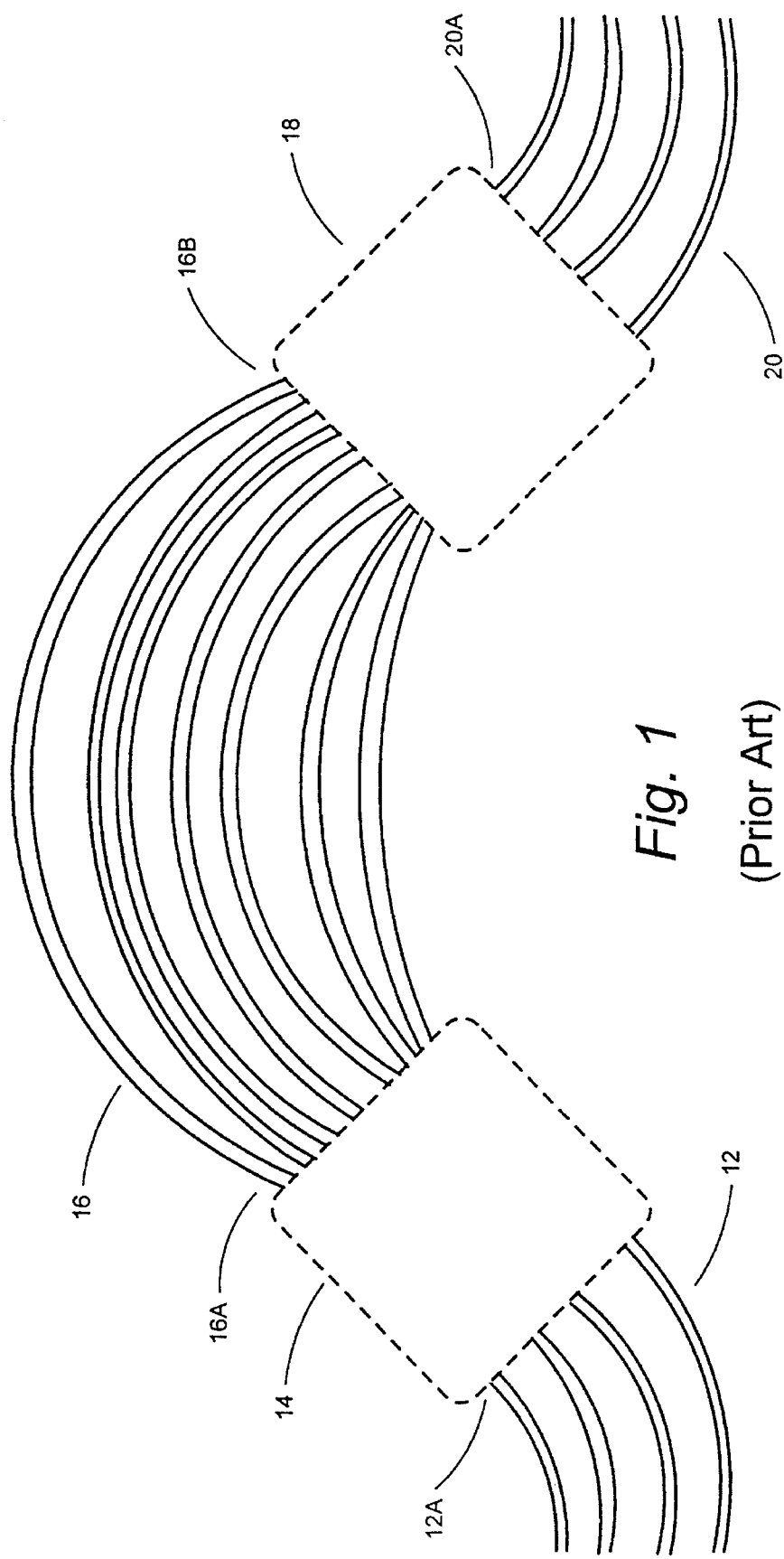
FIG. 1 is a prior art schematic drawing of a waveguide multiplexer.

A prior art optical waveguide multiplexer is shown in FIG. 1, commonly called a Dragone Router. Light enters one of the input ports 12 at 12A and expands in the free space region 14. The light is then optically coupled at 16A to all of the grating arms 16. A constant path length difference between adjacent grating arms 16 causes a wavelength dependent phase shift. This linear phase progression affects the propagation direction of the converging wave radiated into the second free space region 18 at 16B as it moves towards the output ports 20 at 20A. Consequently, light at different wavelengths is coupled to different output ports. Depending upon which input port 12 is used and at what wavelength, the output port 20 can always be predetermined. This determination creates an n x n multiplexer where n is dependent on the number of arms used.

Figure 2:
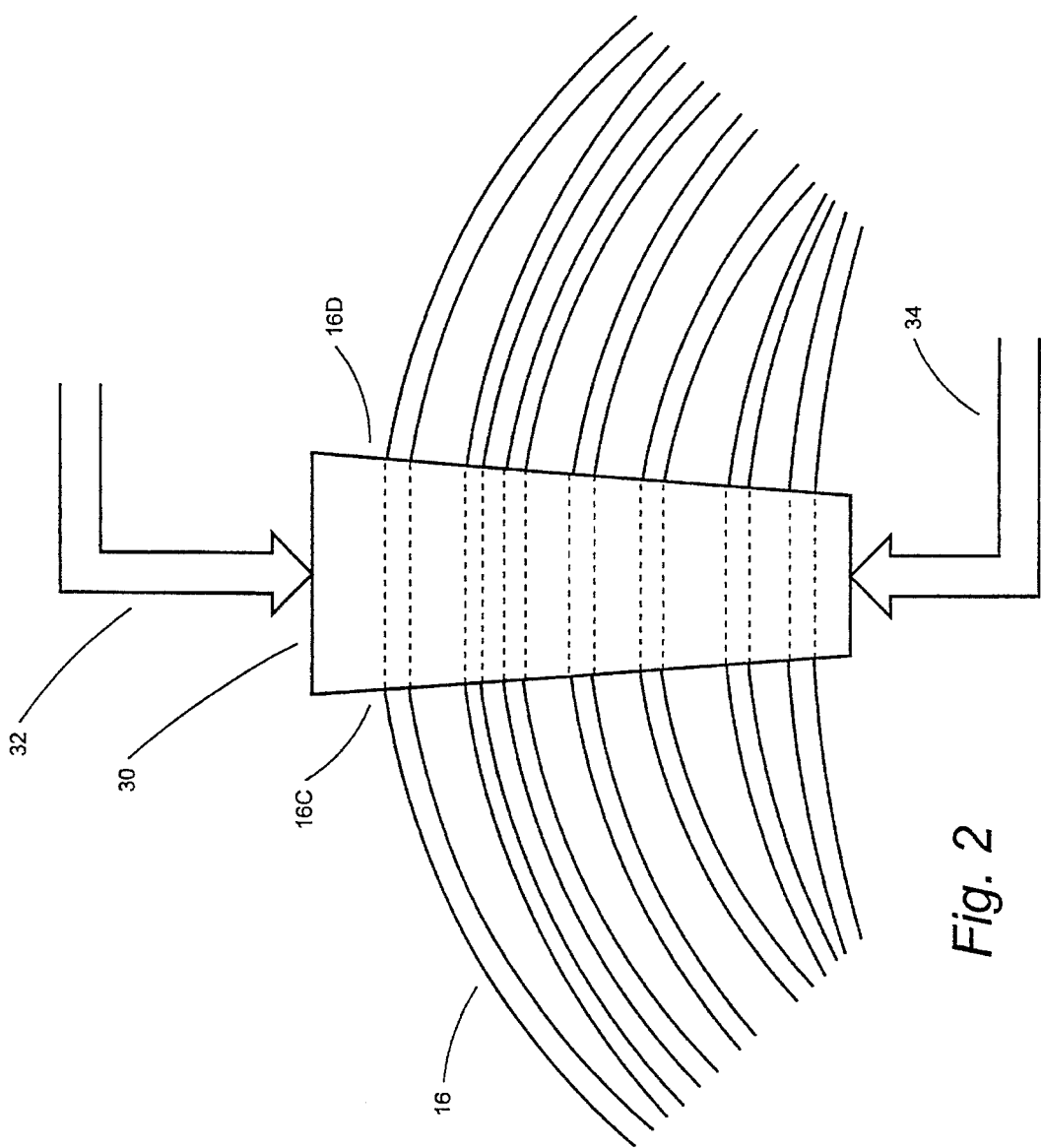
FIG. 2 is a schematic drawing of the triangular shaped active region of a set of waveguides.

FIG. 2 shows the triangular shape of the active region 30. Applying current across the active region 30, frown 32 to 34, causes a phase shift in the signal entering at 16C from any one of the input signals 16. This causes the output at 16D to have a different delay, therefore, tuning the signal as it passes through the grating arms 16. The amount of tuning will vary depending upon the amount of current and the cross section of the grating arms 16 and index structure of the active region 30. The different input ports 16C will thus cause different variations in the delay without having to vary the current.

Figure 3:
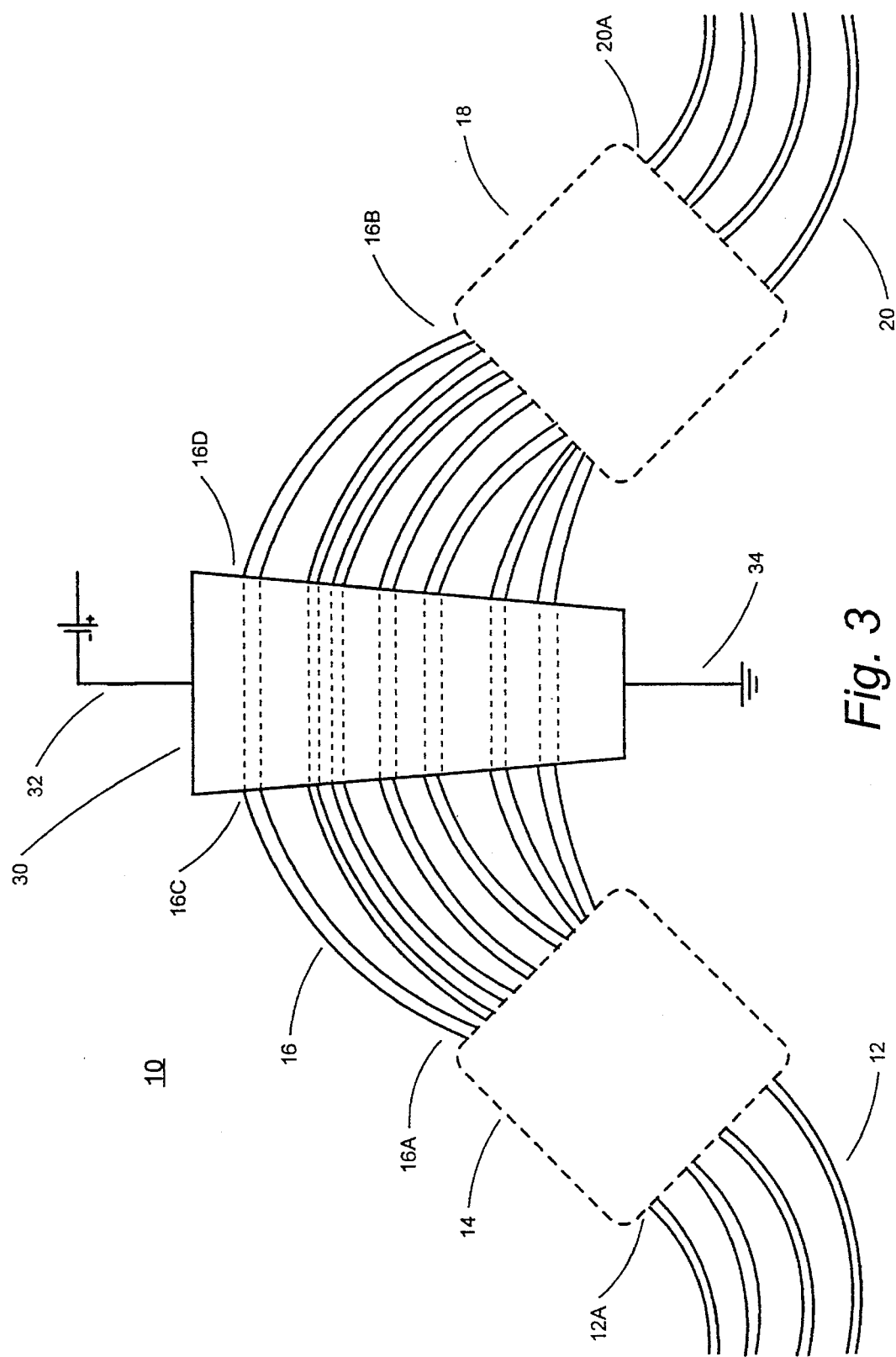
FIG. 3 is a schematic drawing of a tunable waveguide multiplexing router.

FIG. 3 illustrates, in a simplified manner, the desired operation of a silicon-based tunable multiplexer shown generally at 10. The active region 30 as shown in FIG. 2 is now added to the Dragone Router of FIG. 1. Light entering one of the input ports 12 at 12A is expanded in the free space region 14. The light then exits at 16A onto all of the multiplexed grating arms 16 and is optically coupled to the active region 30 comprising a triangular shaped hydrogenated silicon layer at 16C. This coupling to the silicon is highly efficient and has a very low loss of light. As voltage is applied from 32 to 34, the delay of the light in the individual grating arms 16 will vary, allowing the grating arms 16 to be tuned. By tuning the grating arms 16 as such, the output port 20 can vary depending on the amount of delay added to the light. This tuning will cause the light, after entering the free space region 18, to move towards a different output port 20, thus, allowing a variable choice of multiplexer outputs.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A tunable router for providing an output signal of multiplexed wavelengths, comprising:

a plurality of waveguides carrying an input signal having predetermined wavelengths;

a silicon-based layer defining said plurality of waveguides comprising a width which varies along said silicon-based layer length and has an input side and an output side; and means for providing a change in refractive index of a trapezoidal active region of said silicon-based layer to thereby cause a delay shift of said input signal on at least one of said plurality of waveguides;

wherein the degree of delay of said input signal is dependent upon said width of said active region between respective said input side and said output side of said silicon-based layer.

2. The router of claim 1 further comprising a means for optically coupling said plurality of waveguides to an input position of said input side and an output position of said output side of said silicon-based layer.

3. The router of claim 2 wherein said active region of said silicon-based layer comprises hydrogenated amorphous silicon.

4. The router of claim 1 wherein said means for changing the refractive index includes a pair of contacts applying a current across said silicon-based layer.

5. The router of claim 1 wherein said means for changing the refractive index includes a plurality of pairs of contacts applying a current across each waveguide within said silicon-based layer.

6. The router of claim 1 wherein increasing said width between respective said input position and said output position of said silicon-based layer increases degree of said delay shift.

7. A wavelength tunable optical router comprising:

a silicon-based substrate;

an input optical free space region;

an output optical free space region;

a trapezoidal silicon-based active region optically coupled between said input optical free space region and output optical free space region by unequal length waveguides; and means for varying the refractive index of said active region to delay a transmission of said optical router.

8. The router of claim 7 wherein said active region comprises hydrogenated amorphous silicon.

9. The router of claim 7 wherein said means for varying the refractive index includes a pair of contacts applying a current across said silicon-based active region.

10. The router of claim 7 wherein said means for varying the refractive index includes a plurality of pairs of contacts applying a current across each waveguide within said silicon-based active region.

11. A method for tuning a silicon-based router wherein the delay of the output signal can be varied, comprising the steps of:

optically coupling a trapezoidal active region to an optical input;

transmitting said signal across said active region having a defined width which varies along its length;

injecting current into said active region tuning said silicon-based router; and optically coupling said active region to an optical input.

12. The method in claim 11, wherein the step of tuning said silicon-based router varies depending upon the width across said active region.

* * * * *